2,793,712
Patented May 28, 1957

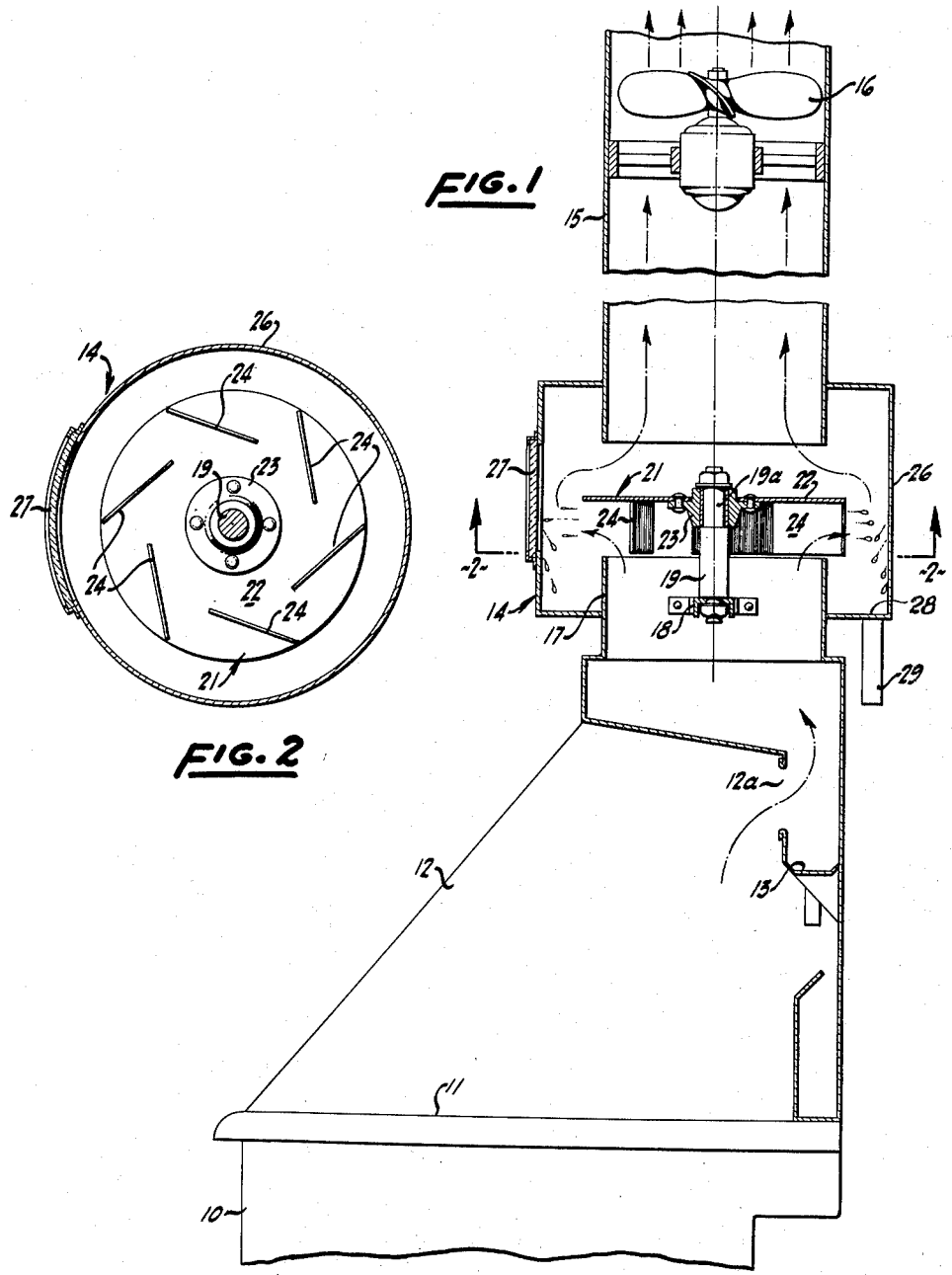

2,793,712

GREASE EXTRACTING ATTACHMENT FOR VENTILATORS FOR KITCHEN RANGES

Edward Graswich and Jack W. Cedarquist, San Francisco, Calif., assignors to Dohrmann Hotel Supply Co., San Francisco, Calif., a corporation of Nevada Application February 26, 1954, Serial No. 412,792

2 Claims. (Cl. 183—77)

The present invention is concerned with kitchen ventilators and with the extraction of grease from the gases withdrawn from a cooking area, such as the range surface or a fry surface in a commercial restaurant or the like and relates more particularly to improved methods and apparatus for establishing an efficient extraction of the grease from such gases.

In the cooking of foods in commercial eating establishments, particularly establishments such as drive-ins where the frying of grease containing food in quantities occurs, the problem of disposing of the gases from over the cooking surface while extracting the grease constituents thereof is quite severe. In accordance with the instant invention, a process and apparatus for extracting the grease or oily constituents of the exhaust gases from kitchen ranges is carried out in a novel and effective manner, and accordingly it is a general object of the invention to provide an improved method and apparatus for the extraction of grease from the exhaust gases from a cooking surface such as a range.

Another object of the invention is to provide an improved apparatus which is simple in its construction and can be readily installed as an attachment in a desired relation to the range or cooking surface with which it is associated.

The above and other objects of the invention are attained as described in connection with a preferred method of carrying out the invention and a preferred apparatus, as illustrated in the accompanying drawings, in which:

Figure 1 is a vertical sectional elevation through a grease extracting unit constructed in accordance with our invention with a range shown schematically.

Figure 2 is a sectional elevational view taken in a plane indicated by the line 2—2 in Figure 1 and showing in bottom plan the grease extracting wheel of the instant invention.

Referring to the drawings, a conventional form of commercial kitchen range 10 is illustrated, having a cooking surface 11 and having respective side plates 12 at each side of the cooking surface, only one of which is seen. Grease laden gases from the surface of the range are extracted through a slot 12a formed above a grease collecting trough 13 and are drawn upwardly through the grease extracting unit 14 and a discharge duct conduit section 15 through which the gases are drawn by a conventional blower 16. In general, the duct or conduit section 15 is cylindrical and leads to a suitable point of discharge of the gases which may be at an elevation of several floors above the street level. Also the exit conduit 17 from the top of the range is cylindrical in form and is preferably of the same diameter as the conduit 15. Between the conduit sections 17 and 15 a grease extracting unit is arranged in which the gases are passed through a movable series of grease extracting blades at the same time that their direction of flow is changed, the construction of the blades being such as to promote turbulence in this zone and to wipe or contact as much of the grease laden gas as possible so that grease particles will be caught on the surfaces of the blades and their support plate. In the conduit 17 a cross channel 18 is suitably secured carrying at a central axial point thereof, an upright stub shaft 19 which at its upper end has journalled thereon a centrifugal extractor or extractor wheel 21 including a baffle interceptor plate 22 secured to a hub 23 and journalled freely on a reduced portion 19a of the shaft 19, and spaced from an outer wall of casing 26 connecting the conduit sections 15 and 17 and forming a conduit portion of enlarged diameter. From the lower surface of the baffle plate 22 there depend a series of grease extracting blades 24 which as shown in Figure 2 are similarly angled with respect to the axis so as to act as drive blades for the wheel 21. These blades 24 are preferably substantially straight so as to be self-cleaning in action and to expel centrifugally therefrom any material collected thereon. It will be noted that the wheel 21 is of greater diameter than the conduit section 17 and extends radially outwardly beyond the upper open end of this conduit section 17.

Preferably the cross sectional area of the vertical annular space between the plate 22 and the upper edge of the conduit section 17 is of substantially the same cross section area as the conduit 17. Also the annular space between the plate 22 and the casing or housing 26 surrounding it is also of substantially this same cross sectional area. The same relation obtains between the lower end of the duct 15 and the top of the plate 22. Thus the cross sectional area of the path of flow of exhaust gases and fumes through the duct section 17, the casing 26 and the duct 15 at the regions of narrowest cross section are all substantially the same so as to enhance an even flow of gas.

The casing 26 is annular in form and is provided with a window 27 for viewing the operation of the wheel 21 and its blades 24. At the bottom of the chamber or casings 26 an annular trap 28 is formed from which a suitable drain pipe 29 extends. In accordance with the method of the instant invention, the air withdrawn from above the range surface 11, including the grease laden components thereof, is drawn through a confined path which may extend either upwardly or downwardly with respect to the top of the range, and this confined path includes a portion of enlarged diameter forming an annular path portion of the same cross sectional area as the other parts of the path, but of greater diameter. This path portion of enlarged diameter provides for movement of the gases radially outwardly, then upwardly, and then inwardly, and a portion of this off-set path overlies the grease trap 28. This annular portion is defined in part by the gas intercepting and deflecting plate 22 of the wheel 21 having the blades 24 extending downwardly therefrom. This structure being freely mounted for rotation on the stub shaft 19, is driven by the flow of air induced from the blower 16 and rotates fairly rapidly so that the blades 24 continually contact and are wiped against or by the grease laden gases escaping from the top of the conduit section 17. The grease droplets or particles in the gas collect on the blades 24 and the plate 22 and are expelled centrifugally therefrom to impinge against the side walls of the casing 26, dropping down into the trap 28 from which a drain 29 extends. Any grease collecting within the hood portion of the range below the duct section 17 is collected in the normal fashion by the gutter 13.

The provision of the rotary extractor 21 in a portion of the outlet path for the grease laden gases provides a very efficient and effective method for collecting the grease for subsequent trapping.

While we have shown and described a preferred manner of carrying out our invention, and a preferred apparatus for the same purpose, the invention is obviously capable of modification and variation from the form shown, so that the scope thereof should be limited only by the scope of the claims appended hereto.

We claim:

1. In a ventilating structure for extracting grease from the grease laden gases of a cooking surface, means forming a discharge path for gases extracted from above said cooking surface, said path forming means including a first duct section positioned to receive gases from said cooking surface, a second similar duct section spaced axially from said first duct section and a third enlarged duct section joined to said first and said second duct sections, a rotatable grease collecting baffle positioned in said enlarged duct section and journaled on one of said sections for rotation in said enlarged duct section, the inner wall of said enlarged duct section being spaced radially from the periphery of said rotatable grease collecting baffle, said baffle being positioned directly across the path of the gases discharged from said first duct section so that said baffle is engaged broadside by said gases and some of the grease carried by said gases condenses on said baffle, means for impelling said gases through said ducts and means for rotating said baffle to centrifugally discharge the grease condensed on said baffle therefrom, said discharged grease being collected by the inner side walls of said enlarged duct, said baffle being so constructed and arranged as radially to direct said gases impinging broadside thereon for removing the major part of the remaining grease carried thereby by abruptly changing the direction of motion of said gases during the passage thereof around the circumference of said baffle.

2. In a ventilating structure for extracting grease from the grease laden gases of a cooking surface, means forming a discharge path for gases extracted from above said cooking surface, said path forming means including a first duct section positioned to receive gases from said cooking surface, a second similar duct section spaced axially from said first duct section and a third enlarged duct section joined to said first and said second duct sections, a rotatable grease collecting baffle positioned in said enlarged duct section and journaled on one of said sections for rotation in said enlarged duct section, the inner wall of said enlarged duct section being spaced radially from the periphery of said rotatable grease collecting baffle, said baffle being positioned directly across the path of the gases discharged from said first duct section so that said baffle is engaged broadside by said gases and some of the grease carried by said gases condenses on said baffle, the path through said first duct, through said enlarged duct around said baffle and through said second duct having at all points substantially the same cross-sectional area so as not to retard the flow of said gases in any of said ducts, means for impelling said gases through said ducts and means for rotating said baffle to centrifugally discharge the grease condensed on said baffle therefrom, said discharged grease being collected by the inner side walls of said enlarged duct, said baffle being so constructed and arranged as radially to direct said gases impinging broadside thereon for removing the major part of the remaining grease carried thereby by abruptly changing the direction of motion of said gases during the passage thereof around the circumference of said baffle.

References Cited in the file of this patent

UNITED STATES PATENTS

| | | |
|---|---|---|
| 544,175 | Iliowizi | Aug. 6, 1895 |
| 602,868 | Nilson | Apr. 26, 1898 |
| 1,610,668 | Freeman | Dec. 14, 1926 |
| 2,226,641 | Sonntag | Dec. 31, 1940 |
| 2,392,038 | Gaylord | Jan. 1, 1946 |
| 2,447,119 | Goodyer | Aug. 17, 1948 |
| 2,532,420 | Pledger | Dec. 5, 1950 |
| 2,657,802 | Reed | Nov. 3, 1953 |